US012805593B2

(12) United States Patent
Bennett

(10) Patent No.: US 12,805,593 B2
(45) **Date of Patent: *Nov. 24, 2026**

(54) HEADWORN DEFOGGER

(71) Applicant: Aaron J. Bennett, Elkhart, IN (US)

(72) Inventor: Aaron J. Bennett, Elkhart, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 19/283,589

(22) Filed: Jul. 29, 2025

(65) Prior Publication Data

US 2025/0351913 A1 Nov. 20, 2025

Related U.S. Application Data

(63) Continuation of application No. 18/445,540, filed on Oct. 3, 2023, now Pat. No. 12,376,640, which is a continuation of application No. 15/998,007, filed on Jun. 8, 2018, now abandoned, which is a continuation-in-part of application No. 29/620,469, filed on Dec. 31, 2016, now abandoned.

(51) Int. Cl.
*A42B 3/24* (2006.01)
*G02C 11/08* (2006.01)

(52) U.S. Cl.
CPC ................ *A42B 3/24* (2013.01); *G02C 11/08* (2013.01)

(58) Field of Classification Search
CPC .................................. A42B 3/24; G02C 11/08
USPC ................. 2/171.3, 436; 94/224; 128/201.15
See application file for complete search history.

(56) References Cited

U.S. PATENT DOCUMENTS

| | | | | |
|---|---|---|---|---|
| 1,354,433 A * | 9/1920 | De-Felice | G02C 11/08 | 2/435 |
| 3,825,953 A * | 7/1974 | Hunter | A61F 9/028 | D16/330 |
| 4,150,443 A * | 4/1979 | McNeilly | A61F 9/028 | 2/436 |
| 4,868,929 A * | 9/1989 | Curcio | A61F 9/02 | 2/435 |
| 5,016,293 A * | 5/1991 | Lickle | A61F 9/028 | 2/435 |
| 5,319,397 A * | 6/1994 | Ryden | G02C 11/08 | 219/522 |
| 5,452,480 A * | 9/1995 | Ryden | G02C 11/08 | 2/436 |
| 8,899,743 B2 * | 12/2014 | Kikuyama | G02C 11/08 | 351/62 |
| 9,149,391 B1 * | 10/2015 | Paolinetti | A61F 9/028 | |
| 9,158,132 B1 * | 10/2015 | Cole | A61F 9/028 | |
| 12,376,640 B2 * | 8/2025 | Bennett | G02C 11/08 | |
| 2010/0024099 A1 * | 2/2010 | Nolan | A61F 9/028 | 2/436 |
| 2012/0246808 A1 * | 10/2012 | Spiro | A61F 9/028 | 2/424 |

(Continued)

*Primary Examiner* — Robert H Muromoto, Jr.

(74) *Attorney, Agent, or Firm* — Gardner, Linn, Burkhart & Ondersma LLP

(57) ABSTRACT

A head-worn air pump is provided in a housing, which directs a stream of air to the goggles between the user and the interior surface of the goggles. The housing is mounted to the user's head independently of the goggles. One or more flexible tubes or hoses can be attached to a manifold or plenum at the housing that receives air under pressure from the pump, and extend from the rear of the head to one or both sides of the goggles. The air can be supplied either at ambient temperature or refrigerated and/or heated, as desired in particular applications.

15 Claims, 9 Drawing Sheets

(56) References Cited

U.S. PATENT DOCUMENTS

| | | | | |
|---|---|---|---|---|
| 2013/0091623 | A1* | 4/2013 | McCulloch | A61F 9/025 2/435 |
| 2015/0116652 | A1* | 4/2015 | Bidinot | G02C 11/08 351/62 |
| 2017/0312557 | A1* | 11/2017 | Schuller | A62B 7/10 |
| 2017/0361133 | A1* | 12/2017 | Yu | A61M 21/00 |

* cited by examiner

HEADWORN DEFOGGER

CROSS-REFERENCE TO RELATED APPLICATIONS

This is a continuation patent application of U.S. patent application Ser. No. 18/445,540, filed Oct. 3, 2023, which is a continuation of U.S. patent application Ser. No. 15/998,007, filed Jun. 8, 2018, which is a continuation-in-part of U.S. design patent application Ser. No. 29/620,469 filed Dec. 31, 2016.

BACKGROUND OF THE INVENTION

The present invention relates to apparatus for de-fogging goggles, eyepieces, face masks, and the like which are worn about a user's face.

Eye protection and/or vision maintaining and/or enhancing devices (generically referred to herein as "goggles") are typically worn on or in close proximity to a person's face for a variety of purposes. Typically, these goggles are used for employment or recreational activities (such as skiing or paint-ball contests). During use, the transparent (or translucent) surface of the goggles can become fogged or clouded up as a result of moisture and/or temperature variances in the vicinity of that surface. Various prior methods have been suggested for preventing and/or removing the fogging moisture accumulation on that transparent/translucent surface, so as to improve visibility therethrough.

Unfortunately, some of these prior methods can provide only temporary prevention of fogging, and repeated application or treatment is required. Other prior devices are cumbersome and/or relatively expensive. Other prior devices can reduce the functionality of the goggles to some degree or restrict movement of the person wearing the goggles.

OBJECTIVES OF THE INVENTION

Accordingly, a primary objective of the present invention is to provide improved method and apparatus for de-fogging and preventing the formation of fog in goggles and the like. These improvements include providing defogging systems which:

a. are inexpensive to manufacture and maintain,
b. increase safe use of goggles and the like,
c. minimize component weight,
d. facilitate user comfort when wearing goggles, and
e. increase the aesthetic appeal of the goggles or associated headwear.

SUMMARY OF THE INVENTION

These and other objectives of the present invention are achieved by the provision of a head-worn air pump which provides a stream of air to the goggles between the user and the transparent/translucent surface. The air pump can be attached to the rear portion of the goggle strap, or to an auxiliary or supplemental strap, so as to be behind the user and out of the line of sight of the user. One or more flexible tubes or hoses can be attached to a manifold or plenum receiving air under pressure from the pump, and lead from the rear of the head to one or both sides of the goggles. A rechargeable battery can power the air pump, and the pump can be switched on and off by a button on the pump housing, even by a user wearing gloves or hand coverings. The battery can be recharged by a conventional USB connection.

The air can be supplied either at ambient temperature or refrigerated and/or heated, as desired in particular applications.

Other objects, advantages, and novel features of the present invention will become readily apparent from the following drawings and detailed description of certain preferred and alternative embodiments.

DETAILED DESCRIPTION OF PREFERRED EMBODIMENTS

Figure 1:
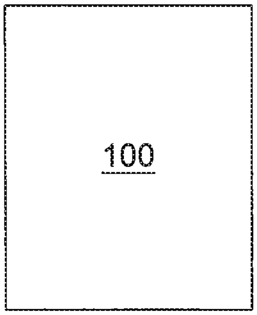
FIG. 1 shows a front view of the generic design of the present invention, the rear side forming no portion of the claimed design.
Figure 2:
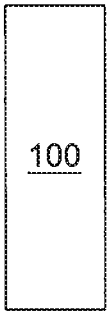
FIG. 2 shows a left side view of the design of FIG. 1, the right side being a mirror image thereof.
Figure 3:
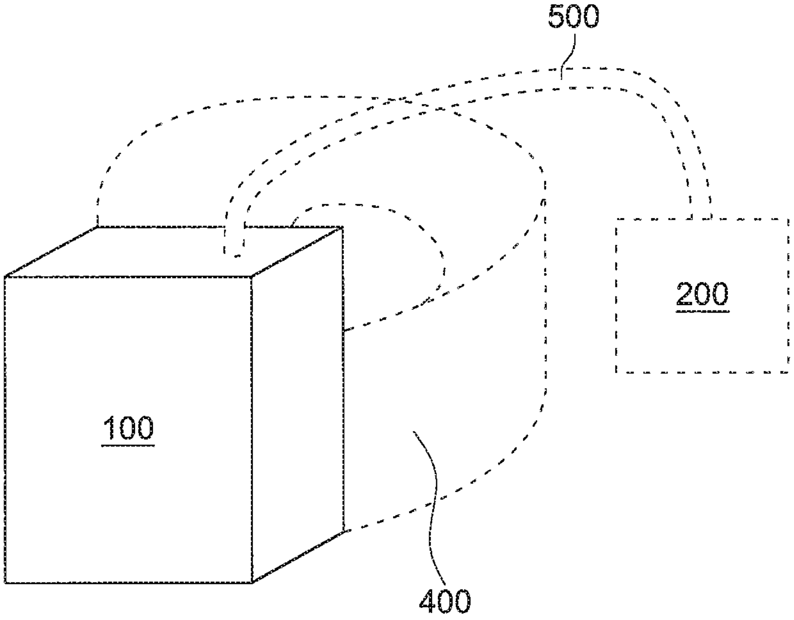
FIG. 3 shows a front, right, upper perspective view of the design of FIG. 1, the bottom side forming no portion of the claimed design, and the goggles, headband and air hoses being illustrated in dashed lines.
Figure 4:
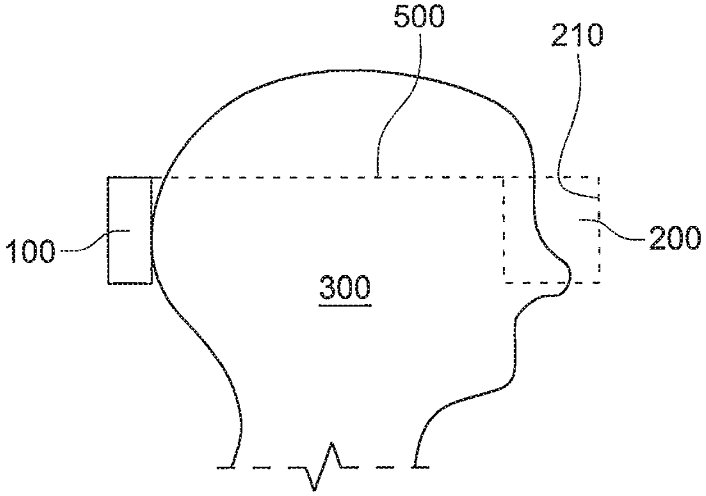
FIG. 4 shows a side view of the design of FIG. 1, as mounted with respect to a user, and the air hose and goggles being illustrated in dashed lines.
Figure 6:
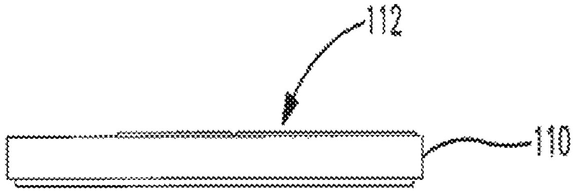
FIG. 6 shows a solid body, top side view of the cover member of FIG. 5, the bottom side view being a mirror image thereof.
Figure 5:
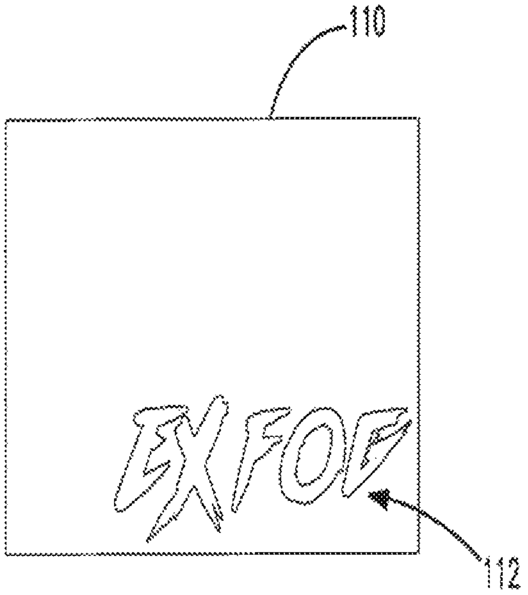
FIG. 5 shows a schematic front view of a preferred embodiment of the cover member of the housing of the present invention.
Figure 7:
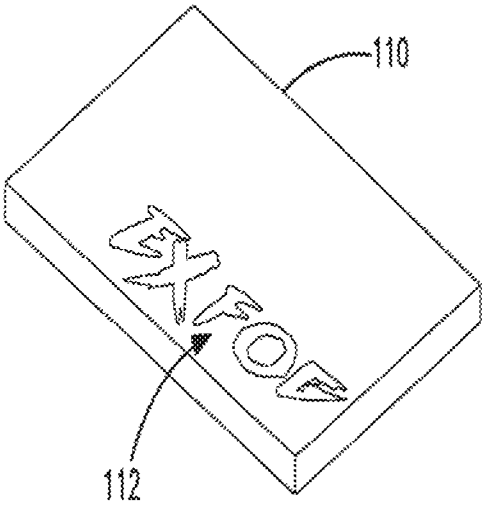
FIG. 7 shows a solid body, lower, right front perspective view of the cover member of FIG. 5.
Figure 8:
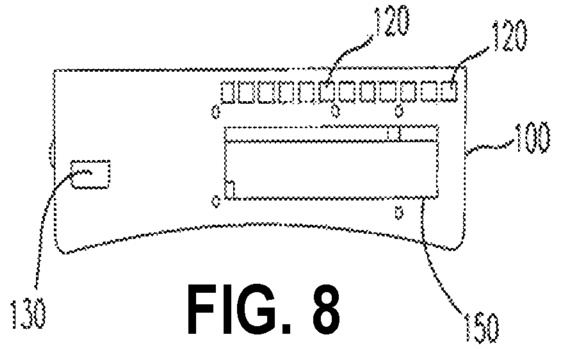
FIG. 8 shows a solid body, bottom side view of a preferred embodiment of the housing of the present invention, the top side view being a mirror image thereof without the enumerated functional features mounted or formed therein.
Figure 9:
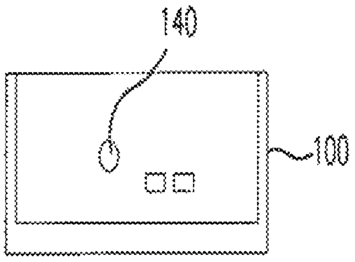
FIG. 9 shows a solid body, left side view of the housing of FIG. 8.
Figure 10:
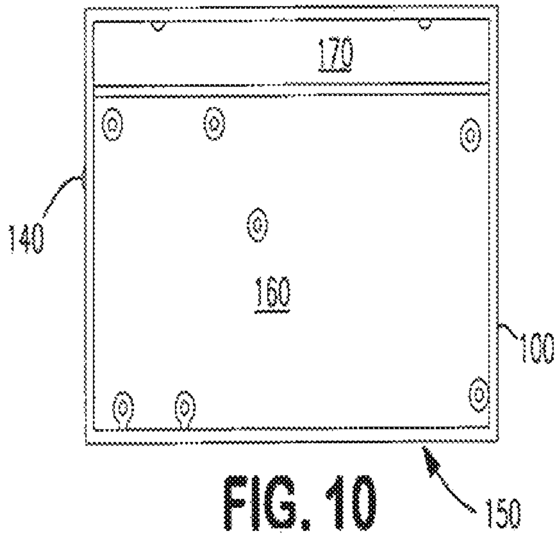
FIG. 10 shows a solid body, front view of the housing of FIG. 8.
Figure 11:
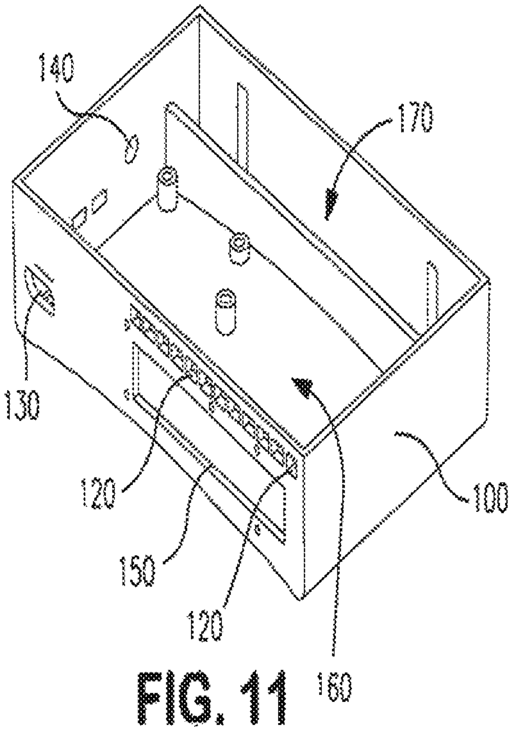
FIG. 11 shows a solid body, lower, right, front view of the housing of FIG. 8.
Figure 12:
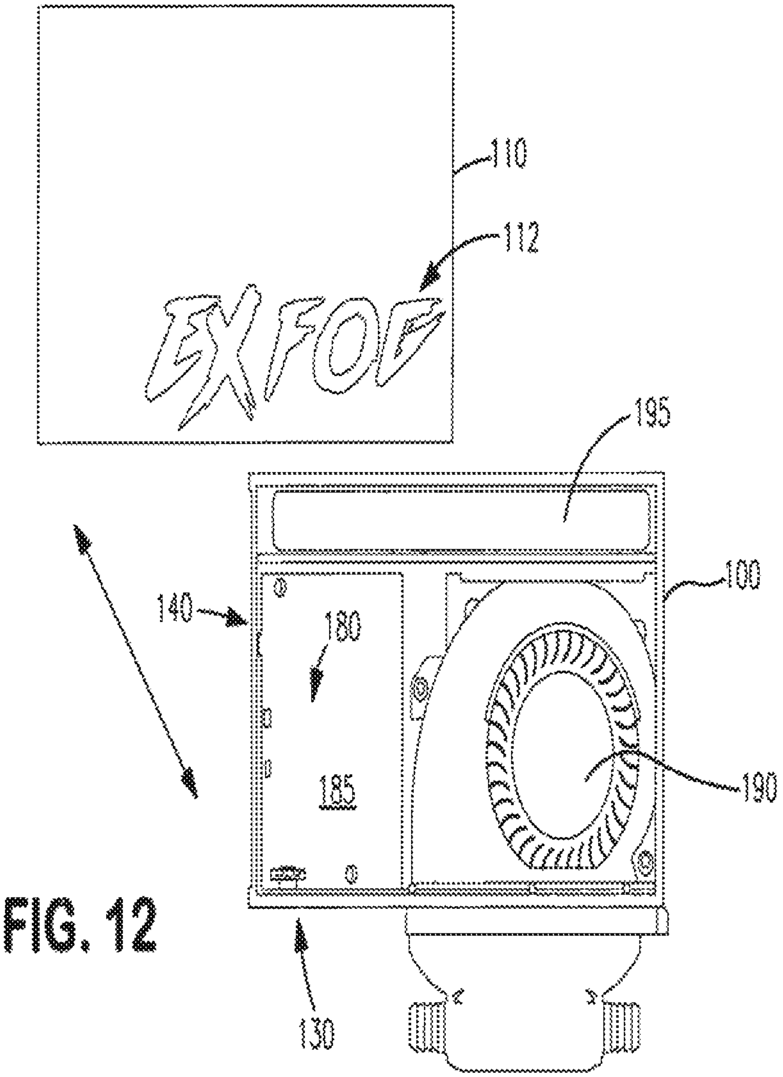
FIG. 12 shows a solid body, partially exploded front view of a preferred embodiment of the present invention, using the cover member of FIG. 5 and the housing of FIG. 8 with a side-to-side manifold for air tubes.
Figure 13:
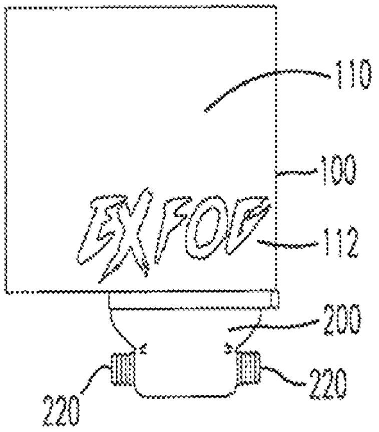
FIG. 13 shows a solid body, front view of the embodiment of FIG. 12, the back view being a mirror image thereof without the enumerated functional features mounted or formed therein and having a curved, head-conformal surface.
Figure 14:
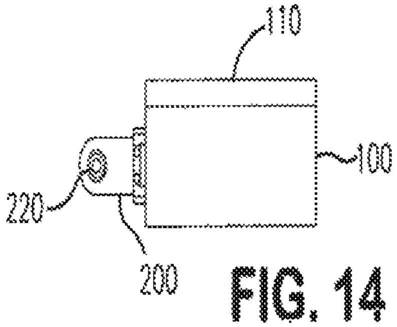
FIG. 14 shows a solid body, right side view of the embodiment of FIG. 12.
Figure 15:
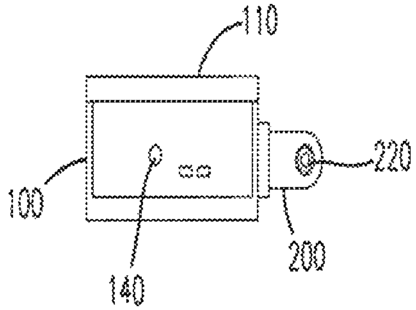
FIG. 15 shows a solid body, left side view of the embodiment of FIG. 12.
Figure 16:
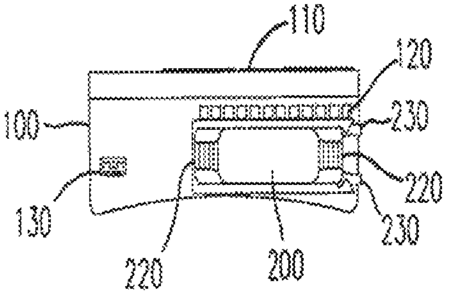
FIG. 16 shows a solid body, bottom view of the embodiment of FIG. 12, the top view being a mirror image thereof without the enumerated functional features mounted or formed therein.
Figure 17:
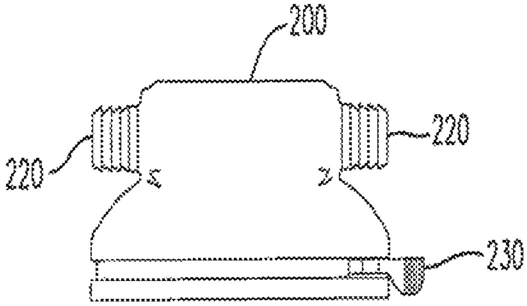
FIG. 17 shows an enlarged solid body, back side view of the side-to-side manifold of the embodiment of FIG. 12, removed from the housing.
Figure 18:
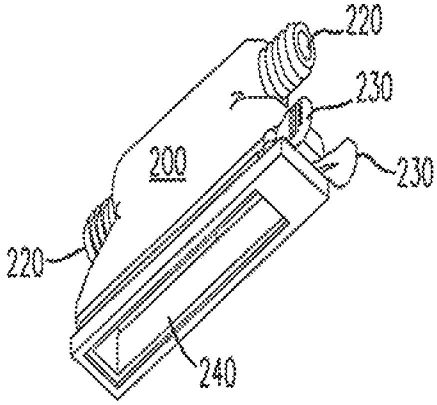
FIG. 18 shows a lower right, back perspective, enlarged schematic view of the manifold of FIG. 17.
Figure 19:
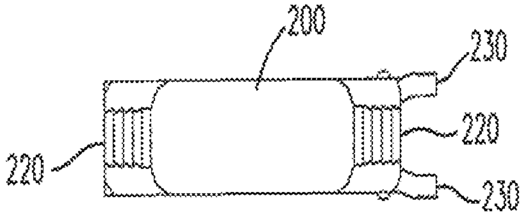
FIG. 19 shows an enlarged solid body, bottom side view of the manifold of FIG. 17.
Figure 20:
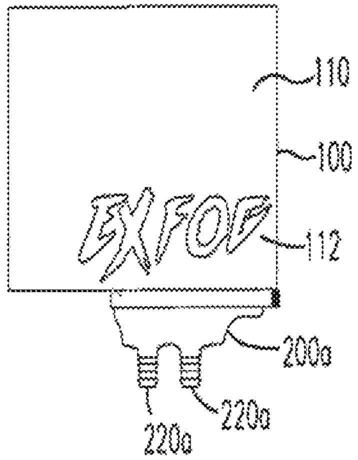
FIG. 20 shows a solid body, front view of an alternative embodiment of FIG. 12 using a rearward directed manifold, the back view being a mirror image thereof without the enumerated functional features mounted or formed therein and having a curved, head conformal surface.
Figure 21:
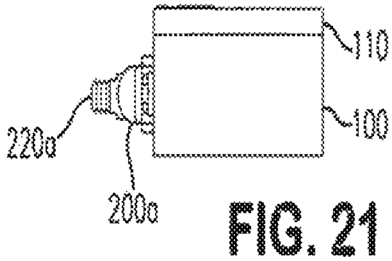
FIG. 21 shows a right side, schematic view of the embodiment of FIG. 20.
Figure 22:
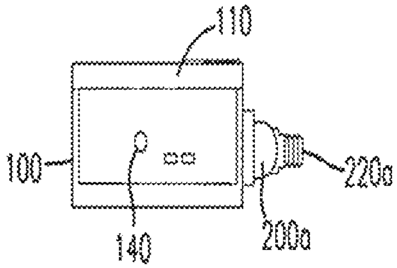
FIG. 22 shows a left side, schematic view of the embodiment of FIG. 20.
Figure 23:
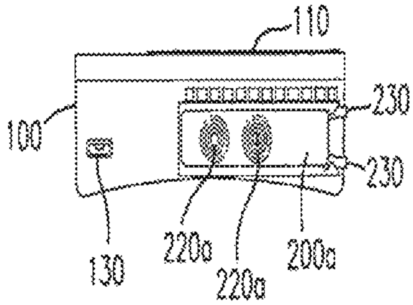
FIG. 23 shows a solid body, bottom view of the embodiment of FIG. 20, the top view being a mirror image thereof without the enumerated functional features mounted or formed therein.
Figure 24:
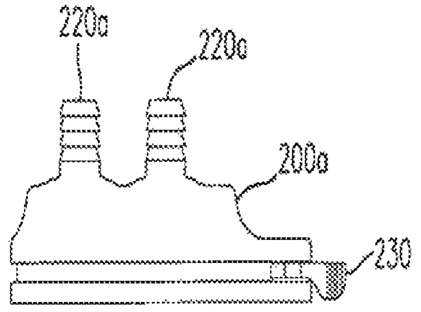
FIG. 24 shows an enlarged solid body, back side view of the rearward directed manifold of the embodiment of FIG. 20, removed from the housing.
Figure 25:
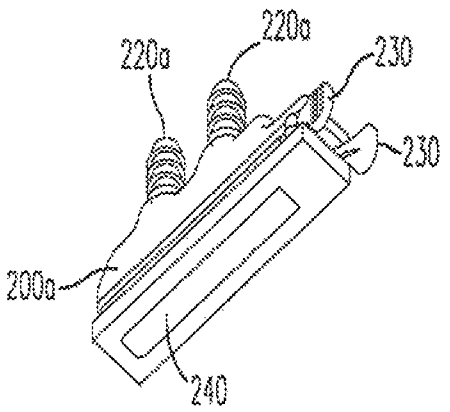
FIG. 25 shows a lower right, back perspective, enlarged schematic view of the manifold of FIG. 24.
Figure 26:
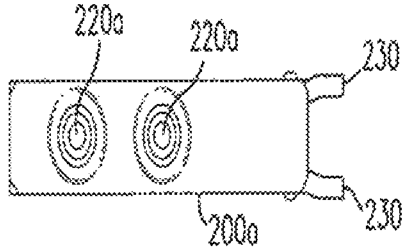
FIG. 26 shows an enlarged solid body, bottom side view of the manifold of FIG. 24.

FIGS. 1-4 illustrate generically present invention. The following features are illustrated in those drawings:

a housing 100 for the air pump, goggles 200, worn by user 300, having a viewing surface 210 of transparent or translucent material, a strap or band 400 for securing the housing to the user, and one or more tubes (or hoses or conduit) 500 for providing air flow from the housing to the goggles, formed, for example, from clear, flexible plastic.

Preferably, housing 100 is relatively small in size and weight, so as to be comfortably worn by the user with a minimum of tubing needed to extend from the air pump to the goggles, since excess tubing and restrict user freedom of movement and may interfere with action of the users, as well as require larger air pump capacity and battery power. Goggles 200 can be a any desired configuration, either fully or partially enclosing the eyes of the users, as desired in particular applications. In those applications where goggles 200 are secured to the head of user 300 by a headband or strap, housing 100 is preferably attachable to that same strap. In other applications, such as eye-wear attaching the goggles to the users by arms resting on the ears, a separate band 400 can be used to attach housing 100 to the head of the user. Housing 100 can be mounted to the top or side of the head of user 300 if only a single tube 500 is needed. In applications where multiple tubes 500 are used (entering at, for example, either side of goggles 200), it is often preferably to secure housing 100 to a neutral or middle location to the head of user 300, such as the top or back of the head. Alternatively, housing 100 can be mounted with a helmet (or like head covering) worn by user 300 and tubes 500 directed to a visor or integral goggles or like eye-protection associated with the helmet. Similarly, where the user is wearing fully encapsulating head covering, or neck protection, or collared clothing, housing 100 can be mounted in certain application in close proximity to the head, either interior or exterior of the other coverings, with tubes 500 connecting to the goggle or eye covering area, and housing 100 having only minimal impact on the user's activities, due to its weight, dimensions, and mounting location.

Preferably, housing 100 is formed with a back surface 105 which is curved or otherwise shaped to conform to the body part (such as the back of the users' head) or other surface to which housing 100 is mounted. In addition to increasing user comfort, such conformity can allow housing 100 to be formed in a more compact, arrangement and be less obstructive of user activities.

Tubes 500 are connected to the goggles or structure adjacent to the transparent or translucent viewing surface of the goggles, preferably between that surface and the user, at such location(s) where the air flow from the tubes will prevent and/or remove the moisture which would otherwise accumulate on the viewing surface. Tubes 500 can be directed to an air plenum or manifold portion of the goggles to aid in that regard and provide a greater surface area of moisture clearance.

Figure 27:
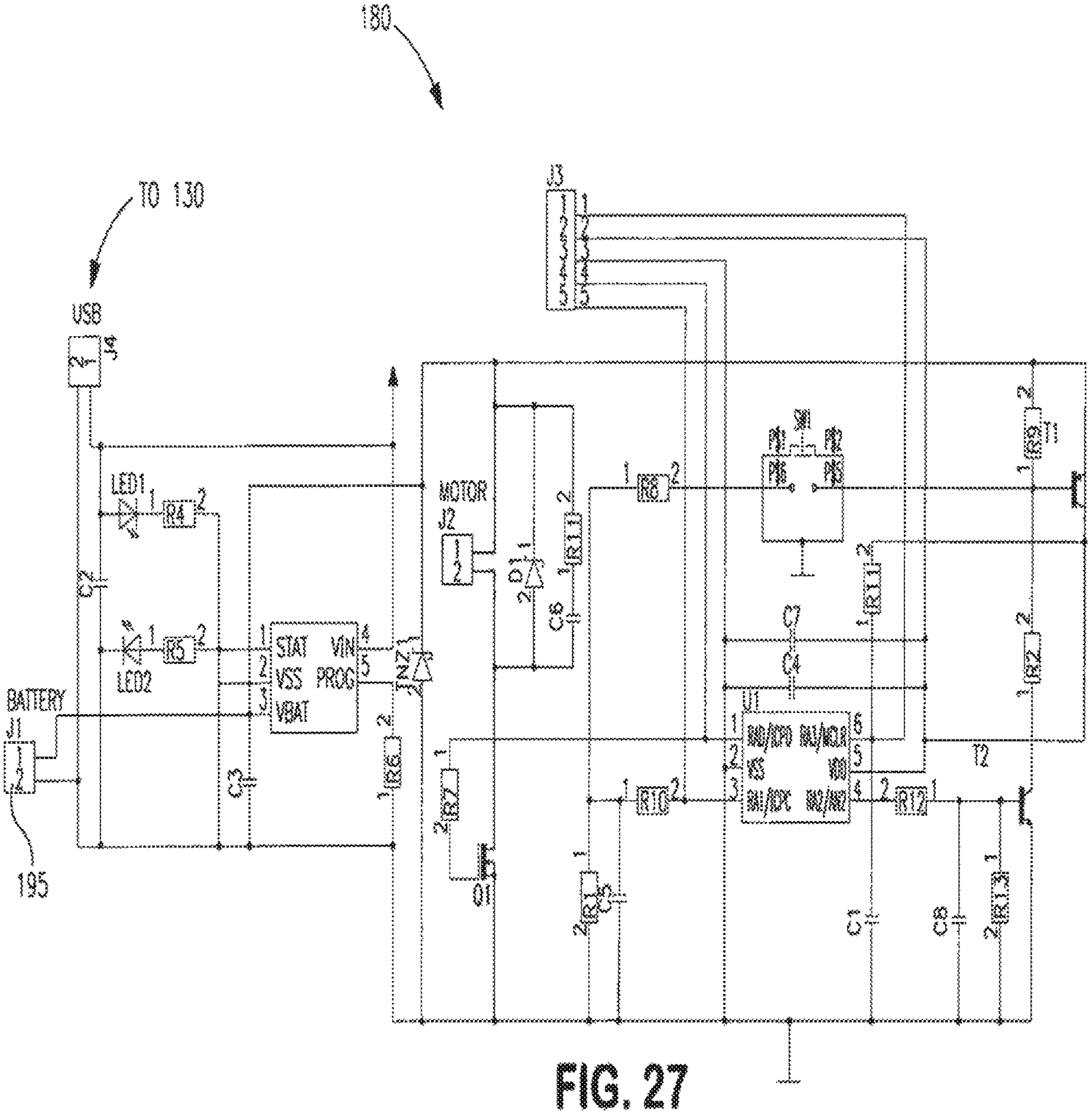
FIG. 27 shows a schematic for the fan control circuit of the embodiment of FIG. 12.

FIGS. 5-26 illustrate specific and preferred embodiments of the present invention, particularly as to the details of housing 100. The following features are illustrated in those drawings:

a cover member 1 10 for housing 100, preferably dimensioned so as to allow spacial area for a manufacturer's trademark or the user's name to be applied thereto as at location 112.

air inlets 120 in housing 100, battery charging opening 130 in housing 100, preferably sized to allow a USB connection for charging, an air pump actuating switch 140 in housing 100 (aligned with the associated control elements of the electrical circuit of FIG. 27, as is convention), a manifold or plenum opening 150 in housing 100, preferably adapted to receive multiple alternative manifolds, an air pump chamber 160 within housing 100, a battery chamber 170, within housing, an air pump assembly, comprising a fan control circuit 180 (preferably mounted on a circuit board 185), and an electrical fan 190, powered by a battery 195, a manifold 200, for receiving compressed air from fan 190 and distributing that air for flow to one or more tubes 500 through one or more outlets 220, and alternative manifold 200*a* with outlets 220*a*.

The fan control circuit can be of any desired. format depending upon the fan and battery selected in a given application. However, one such suitable circuit, formed from conventional and commercially available elements, of Poly Electronics company of Elkhart, IN, is shown in FIG. 27. Preferably, battery 195 is a high capacity, rechargeable lithium-ion battery.

Switch 140 can be merely an on/off button or a volume metric control knob, such as a rheostat to determine fan speed and/or air flow volume into the manifolds.

In given applications, different manifolds can be used to received compressed air from fan 190 through opening 150. The figures illustrate two alternative manifolds, 200 and 200*a*, each with two openings for providing air flow to tubes 500. However, in a given application, only a single opening may be needed, as where only a only a single tube is needed. To aid in reducing manufacturing costs, the manifolds of the present invention can be formed with compressible tabs 230 which permit the manifold to be more readily removable from housing 100, and/or to facilitate with registration of opening 150 of housing 100 with opening 240 of the manifolds. The manifolds can be formed with a variety of structure to assist in connection with tubes 500, such as the ferrules illustrated in the drawings adjacent outlets 220 and 220*a*.

In many applications compressed air drawn into fan 190 through inlets 120 will be sufficient to prevent and/or clear the goggles without additional heating or cooling. However, the present invention contemplates that in particular applications it may be desirable to add supplemental heating or cooling elements to the air pump, either of which may be readily controlled by appropriate modification to circuit 180 in a conventional manner or otherwise. To some extent, for example, the flow of air past the resistor elements of circuit 180 may itself induce heating of the air sent through tubes 500.

Likewise, the compression of air by fan 190 may inherently heat that air to some degree. Similarly, in given applications, the flow of air through tubes 500 may induce sufficient cooling of the air from the external environment to provide appropriate fog reduction at the viewing surface of the goggles.

Although the present invention has been shown and described herein with respect to certain preferred embodiments and alternative configurations, those were by way of illustration and example only. For example, in addition to defogging applications, the present teachings of the invention could be applied to prevent dust build-up on eye wear or to remove other obstructions to vision adjacent the eyes. Accordingly, the spirit and scope of the present invention is intended to be limited only by the terms of the appended claims.

The invention claimed is:

1. An apparatus for use with eye-wear having a viewing surface and structure for securing the eye-wear to a head of a user to cover eyes of the user, said apparatus comprising:

a housing mountable to the user's head independent from the eye-wear, said housing having an opening;

an air pump mounted in said housing, said air pump having a fan and a control circuit to selectively operate said fan, and said air pump having an outlet aligned with said opening of said housing;

a manifold mounted at said opening of said housing, said manifold including at least two outlets and an inlet for receiving compressed air and outputting the air through said first and second outlets of said manifold; and first and second tubes connected to said first and second outlets of said manifold, respectively, and said first and second tubes having outlet ends and extending between said manifold and the viewing surface of the eye-wear with said outlet ends of said first and second tubes directing air from said manifold to direct two separate streams of air to the inside surface of the eyewear, and said first and second tubes being separate from the structure for securing the eye-wear to the head of the user.

2. The apparatus according to claim 1, further comprising a strap for securing to the head of a user, and said housing being attached to said strap.

3. The apparatus according to claim 1, wherein said first and second tubes direct the two separate streams therefrom to direct two separate streams of air to the inside surface of the eye-wear.

4. The apparatus according to claim 1, wherein said first and second tubes direct the two separate streams to two different locations of the inside of the viewing surface of the eye-wear.

5. The apparatus according to claim 1, wherein the eye-wear is protective goggles, the protective goggles for surrounding an area around the eyes of the user to prevent contact with the eyes from exterior materials, the protective goggles including the viewing surface, and said first and second tubes being configured to connect to the goggles adjacent the viewing surface to prevent or reduce fogging of the viewing surface.

6. The apparatus according to claim 1, wherein said manifold comprises a first manifold with said first and second outlets having a first arrangement, said first manifold being releasably coupled at said opening of said housing to allow said first manifold to be selectively removed from said housing, said apparatus further comprising a second manifold, and said second manifold for releasably coupling at said opening of said housing to replace said first manifold when removed, and said second manifold having first and second outlets in a second arrangement different than said first arrangement of said first manifold to provide different connection locations for said second and first tubes.

7. The apparatus according to claim 6, further comprising compressible tabs for releasably coupling each of said first and second manifolds to said housing.

8. The apparatus according to claim 1, said housing further having an intake opening, and said housing being configured to orient said intake opening downward when mounted to the head of the user.

9. The apparatus according to claim 1, wherein said housing includes a curved surface to conform to the head of the user.

10. The apparatus according to claim 1, wherein said air pump includes a heating element or a cooling element to vary the temperature of the air.

11. The apparatus according to claim 1, in combination with the goggles, wherein said first and second tubes are connected to said goggles wherein said outlet ends of said first and second tubes are orthogonal to said viewing surface of said goggles.

12. A defogger kit for use with eye-wear, the eye-wear having a viewing surface and structure for securing the eye-wear to a head of a user, said defogger kit comprising:

a housing mountable adjacent to the user's head independent from the eye-wear, said housing having an opening;

an air pump mounted in said housing, said air pump having a fan and a control circuit to selectively operate said fan, and said air pump having an outlet aligned with said opening of said housing;

a first manifold for releasably mounting at said opening of said housing, said first manifold including first and second outlets and an inlet in communication with said outlet of said air pump through said opening of said housing when mounted at said opening for receiving air from said air pump and for separating and outputting the air flow from said two outlets of said manifold into two separate air flows, and said first and second outlets in a first configuration for coupling to first and second tubes, said first and second tubes having outlet ends for directing air from said first manifold to direct two separate streams of air to the inside surface of the eyewear, and said first and second tubes being separate from the structure for securing the eye-wear to the head of the user; and a second manifold for releasably mounting at said opening of said housing when said first manifold is removed from said housing, said second manifold including first and second outlets and an inlet in communication with said outlet of said air pump through said opening of said housing when mounted to said housing for receiving air from said air pump, said first and second outlets of said second manifold in a second configuration for coupling to said first and second tubes, and said outlets of said first and second tubes for directing air from said second manifold to direct two separate streams of air to the inside surface of the eye-wear.

13. The defogger kit according to claim 12, in combination with said first and second tubes for coupling to said first or second manifold.

14. The defogger kit according to claim 13, wherein when said first and second tubes are coupled to said first and second outlets of said first manifold, said first and second tubes are directed in opposed directions from each other from said first manifold, and when said first and second tubes are coupled to said first and second outlets of said second manifold, said first and second tubes are directed in the same direction from said second manifold.

15. The defogger kit according to claim 12, further comprising compressible tabs to releasably mount said first manifold and/or said second manifold to said housing.

* * * * *